United States Patent
Turnquist et al.

[11] Patent Number: 6,105,966
[45] Date of Patent: Aug. 22, 2000

[54] BRUSH SEAL SEGMENT

[75] Inventors: Norman Arnold Turnquist, Cobleskill; Osman Saim Dinc, Troy; George Ernest Reluzco, Schenectady; Robert Harold Cromer, Johnstown; David Robert Skinner, Patternsonville; Christopher Edward Wolfe, Niskayuna, all of N.Y.

[73] Assignee: General Electric Company, Schenectady, N.Y.

[21] Appl. No.: 09/131,485

[22] Filed: Aug. 10, 1998

[51] Int. Cl.⁷ ..................................................... F16J 15/447
[52] U.S. Cl. ............................ 277/355; 277/415; 277/422
[58] Field of Search ..................................... 277/355, 415, 277/421, 422

[56] References Cited

U.S. PATENT DOCUMENTS

| | | | |
|---|---|---|---|
| 4,971,336 | 11/1990 | Ferguson | 277/355 |
| 5,110,033 | 5/1992 | Noone et al. | 288/160 |
| 5,176,389 | 1/1993 | Noone et al. | 277/355 |
| 5,316,318 | 5/1994 | Veau | 277/355 |
| 5,401,036 | 3/1995 | Basu | 277/355 |
| 5,474,306 | 12/1995 | Bagepalli et al. | 277/355 |
| 5,568,931 | 10/1996 | Tseng et al. | 277/355 |
| 5,613,829 | 3/1997 | Wolfe et al. | 415/174.1 |
| 5,630,590 | 5/1997 | Bouchard et al. | 277/53 |
| 5,678,898 | 10/1997 | Bagepalli et al. | 300/21 |
| 5,749,584 | 5/1998 | Skinner et al. | 277/355 X |
| 5,884,918 | 3/1999 | Basu et al. | 277/355 |
| 5,961,280 | 10/1999 | Turnquist | 277/355 X |

FOREIGN PATENT DOCUMENTS

| | | | |
|---|---|---|---|
| 293140 A2 | 11/1988 | European Pat. Off. | 277/355 |
| 453315 A1 | 10/1991 | European Pat. Off. | 277/355 |

*Primary Examiner*—Anthony Knight
*Assistant Examiner*—Vishal Patel
*Attorney, Agent, or Firm*—Marvin Snyder; Douglas E. Stoner

[57] ABSTRACT

A brush seal segment useful, when circumferentially arrayed with other such segments, to seal the gap between a rotor and a surrounding casing of a rotary machine such as a steam turbine. An annular backing plate has a rim radially-inwardly bounding together upstream-facing and downstream-facing surfaces. Canted bristles abut the upstream-facing surface. The rim is designed to allow the bristles to recover from a rotor rub. In one design, the rim acts as a labyrinth-seal tooth and is shaped to deform, under a radial force, longitudinally away from the upstream-facing surface. In another design, the rim has a more-inwardly projecting second portion near a radially-aligned edge, and only this second portion acts as a labyrinth-seal tooth.

9 Claims, 4 Drawing Sheets

BRUSH SEAL SEGMENT

FIELD OF THE INVENTION

The present invention relates generally to seals, and more particularly to a brush seal segment.

BACKGROUND OF THE INVENTION

Rotary machines include, without limitation, turbines for steam turbines and compressors and turbines for gas turbines. A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas-path leakage in the turbine or compressor area of a gas turbine, between the rotor of the turbine or compressor and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

Annular brush seals have been proposed for use between a rotor and a surrounding casing in gas and steam turbines. The annular brush seal includes an annular backing plate which may terminate in the shape of an annular labyrinth-seal tooth having a sloped downstream-facing surface and also includes bristles which are canted at typically a forty-five degree angle with respect to a radius line. A gas or steam turbine brush seal is made up of circumferentially-arrayed and radially-cut brush seal segments. The angled bristles create an exposed area at one circumferential edge of each segment. The labyrinth-seal tooth reduces leakage through this exposed area. Unfortunately, Applicants have found that radial contact of the labyrinth-seal tooth with the rotor during startup deformed the annular tooth into large circumferential areas of bristles preventing recovery of these bristles once the rotor reached steady-state operating conditions. The unrecovered bristles allowed large leakage.

SUMMARY OF THE INVENTION

In a first preferred embodiment, the brush seal segment of the invention includes a brush-seal backing plate and brush-seal bristles. The backing plate has a shape of generally an annular segment of a circular ring which has a longitudinal axis. The backing plate has generally upstream-facing and downstream-facing surfaces with the upstream-facing surface aligned generally perpendicular to the axis. The backing plate has generally radially-aligned first and second edges circumferentially bounding together the upstream-facing and downstream-facing surfaces. The backing plate has a rim radially-inwardly bounding together the upstream-facing and downstream-facing surfaces, wherein the rim has first and second portions, wherein the first portion circumferentially extends from the first edge to the second portion, wherein the second portion is located near the second edge, and wherein the second portion extends radially inward further than the first portion. The bristles generally abut the upstream-facing surface and are each canted at a generally-identical angle with respect to a corresponding radius line extending outward to each of the bristles. The bristles are generally entirely circumferentially contained between a radius line extending outward to the first edge and a radius line extending outward to the second edge, and the bristles extend inwardly beyond said rim from generally the first portion only of the rim.

In a second preferred embodiment, the brush seal segment of the invention includes a brush-seal backing plate and brush-seal bristles. The backing plate has a shape of generally an annular segment of a circular ring which has a longitudinal axis. The backing plate has generally upstream-facing and downstream-facing surfaces with the upstream-facing surface aligned generally perpendicular to the axis. The backing plate has generally radially-aligned first and second edges circumferentially bounding together the upstream-facing and downstream-facing surfaces. The backing plate has a rim radially-inwardly bounding together the upstream-facing and downstream-facing surfaces, and the rim is deformable, under a radial force, longitudinally away from the upstream-facing surface. The bristles generally abut the upstream-facing surface and are each canted at a generally-identical angle with respect to a corresponding radius line extending outward to each of the bristles. The bristles are generally entirely circumferentially contained between a radius line extending outward to the first edge and a radius line extending outward to the second edge, and the bristles extend inwardly beyond the rim.

Several benefits and advantages are derived from the invention. In the first embodiment, only the small second portion of the rim will deform when the brush seal segment experiences a transient rotor rub. Since generally no bristles extend from the second portion of the rim because of the bristle angle, the deformed rim generally will not interfere with the bristles even if the rim deforms longitudinally toward the upstream-facing surface of the backing plate, and thus the bristles can recover from a rotor rub. In the second embodiment, the rim is shaped to deform longitudinally away from the upstream-facing surface of the backing plate, so the deformed rim will not interfere with the bristles, and thus the bristles can recover from a rotor rub.

DETAILED DESCRIPTION OF THE INVENTION

Figure 1:
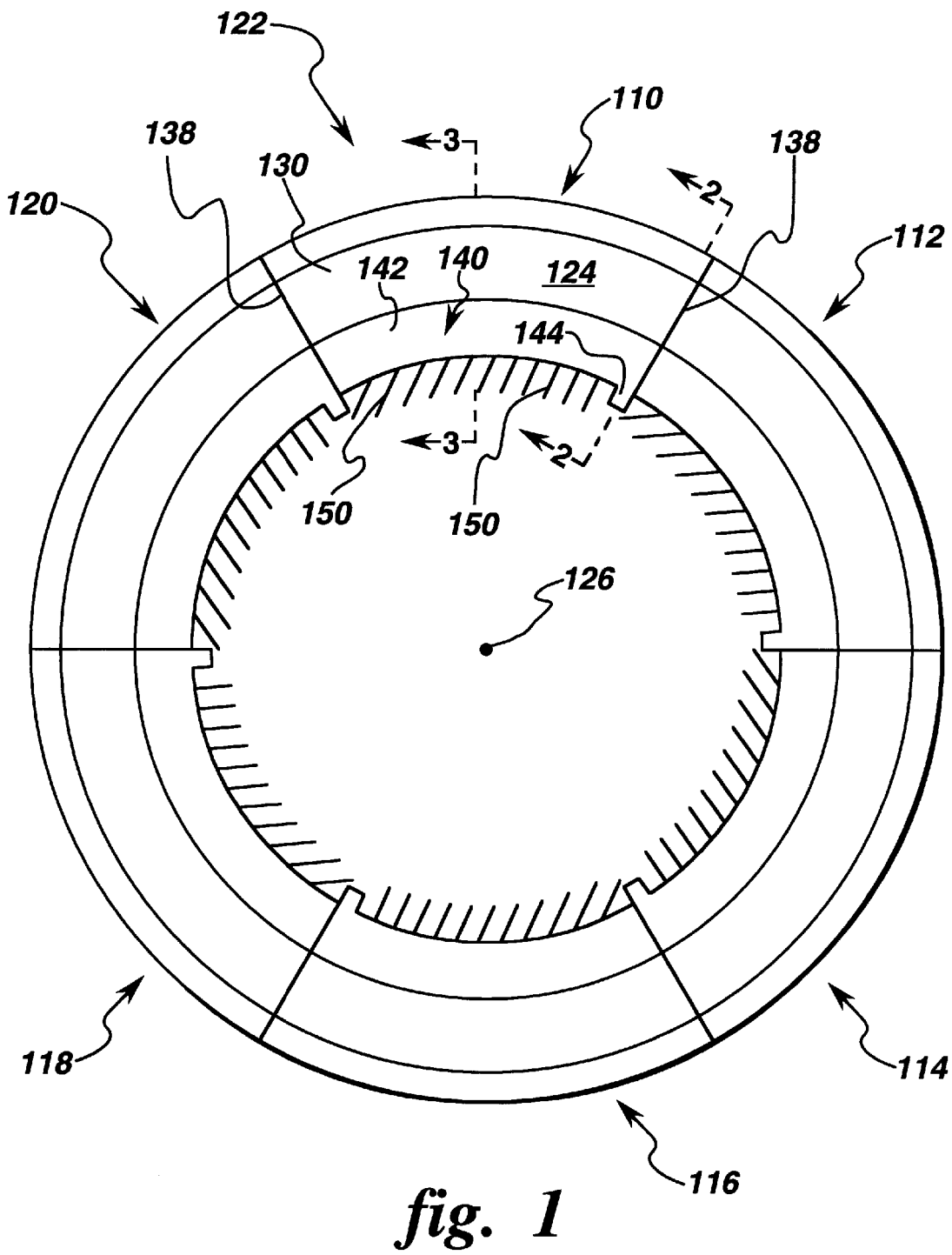
FIG. 1 is a schematic upstream-facing view of a first preferred embodiment of the brush seal segment of the invention shown circumferentially arrayed with other identical brush seal segments to define a brush seal.
Figure 2:
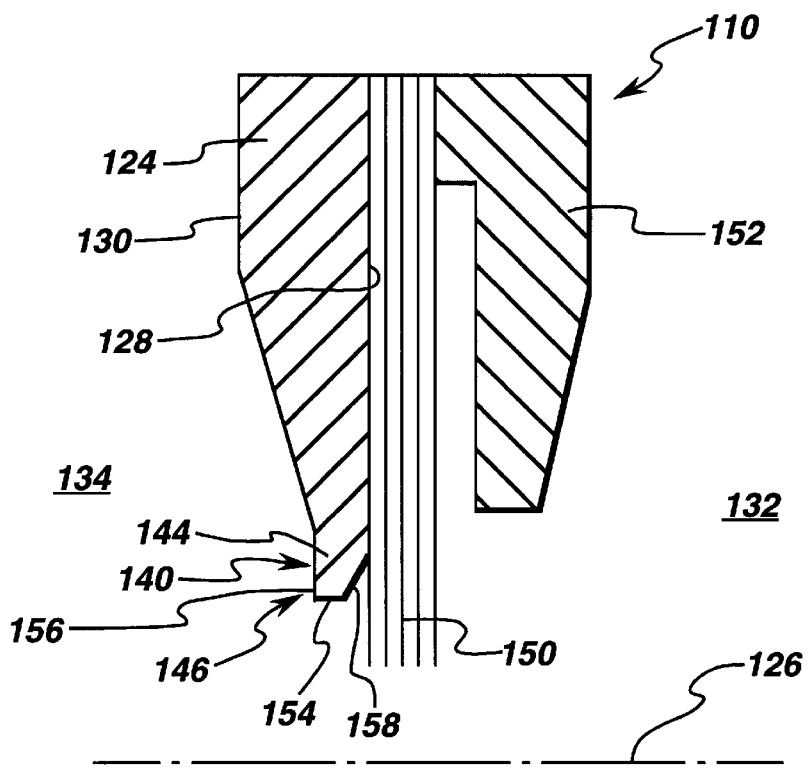
FIG. 2 is a cross-sectional view taken along lines 2—2 of FIG. 1.
Figure 3:
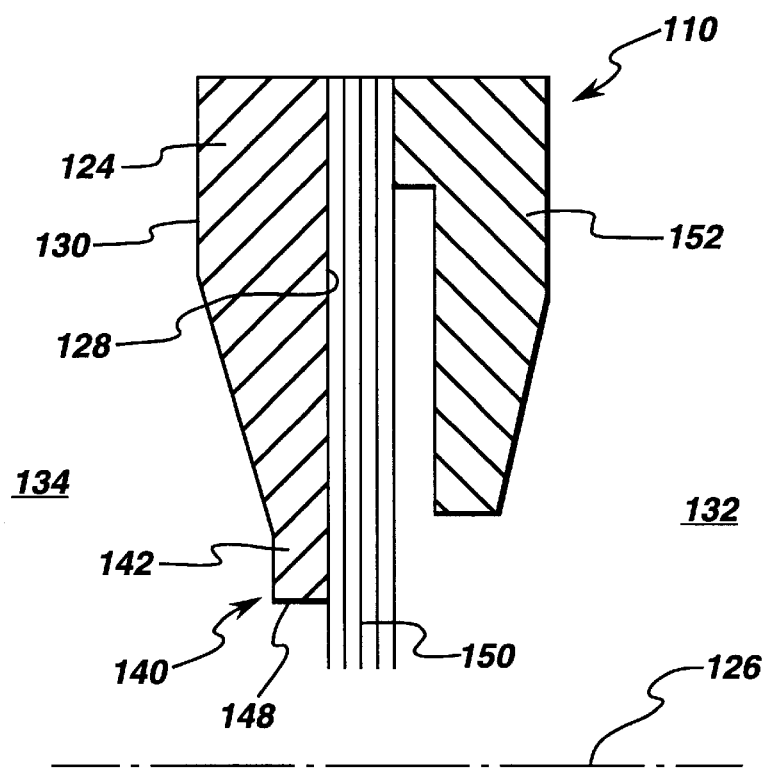
FIG. 3 is a cross-sectional view taken along lines 3—3 of FIG. 1.

Referring now to the drawings, FIGS. 1–3 schematically show a first preferred embodiment of the brush seal segment 110 of the present invention together with five other identical brush seal segments 112, 114, 116, 118, and 120 all circumferentially arrayed to define an annular brush seal 122. Preferably, the annular brush seal 122 is for use in a rotary machine (not shown in the figures) with the brush seal being disposed in the annular gap between a rotor and a surrounding casing of the rotary machine and with the brush seal being attached to the casing. A preferred rotary machine is a steam turbine or a gas turbine.

The brush seal segment 110 includes a brush seal backing plate 124. As seen in FIG. 1, the backing plate 124 has a shape of generally an annular segment of a circular ring (e.g., the brush seal 112) having a longitudinal axis 126 (seen on end as a dot in FIG. 1 and seen as a dashed line in FIGS. 2 and 3). The backing plate 124 has generally upstream-facing and downstream-facing surfaces 128 and 130 with the upstream-facing surface 128 aligned generally perpendicular to the axis 126. For the purpose of describing the invention, an upstream-facing surface is defined as a surface which faces generally toward the higher-pressure side 132, and away from the lower-pressure side 134, of the seal segment 110, and a downstream-facing surface is defined as a surface which faces generally toward the lower-pressure side 134, and away from the higher-pressure side 132, of the seal segment 110. The backing plate 124 has generally radially-aligned first and second edges 136 and 138 circumferentially bounding (i.e., attaching) together the upstream-facing and downstream-facing surfaces 128 and 130.

The backing plate 124 also has a rim 140 radially-inwardly bounding (i.e., attaching) together the upstream-facing and downstream-facing surfaces 128 and 130. The rim 140 circumferentially extends from the first edge 136 to the second edge 138. The rim 140 has first and second portions 142 and 144. The first portion 142 of the rim 140 circumferentially extends from the first edge 136 to the second portion 144. The second portion 144 is disposed proximate the second edge 138, and the second portion 144 extends radially inward further than the first portion 142.

Preferably, the second portion 144 of the rim 140 of the backing plate 124 has a shape of a labyrinth-seal tooth 146 when the backing plate 124 is viewed in a first cross section (see FIG. 2) taken by a cutting plane defined by the intersection of the axis 126 and a radius line which extends radially outward (from the axis 126) to the second portion 144. It is also preferred that the first portion 142 of the rim 140 of the backing plate 124 has a shape other than that of a labyrinth-seal tooth when the backing plate 124 is viewed in a second cross section (see FIG. 3) taken by a cutting plane defined by the intersection of the axis 126 and a radius line (from the axis 126) which extends radially outward to the first portion 142. In an exemplary enablement, the first portion 142 of the rim 140 of the backing plate 124 has a shape of a line 148 which is generally parallel to the axis 126 when the backing plate 124 is viewed in the second cross section (see FIG. 3).

The brush seal segment 110 also includes brush-seal bristles 150 generally abutting the upstream-facing surface 128 of the backing plate 124. The bristles 150 are each canted at a generally-identical angle with respect to a corresponding radius line extending outward (from the axis 126) to each of the bristles 150. Preferably, the angle of the bristles 150 is generally forty-five degrees. The bristles 150 are generally entirely circumferentially contained between a radius line extending outward (from the axis 126) to the first edge 136 and a radius line extending outward (from the axis 126 ) to the second edge 138. Thus, the brush seal segment 110, including its just-described bristles 150 and previously-described backing plate 124, is said to be radially cut. The bristles 150 extend inwardly beyond the rim 140 from generally the first portion 142 only of the rim 140. Thus, generally no bristles 150 extend from the second portion 144 of the rim 140 because of the bristle angle.

The first preferred embodiment of the brush seal segment 110 of the present invention offers advantages, as can be appreciated by those skilled in the art. Only the small second portion 144 of the rim 140 will deform when the brush seal segment 110 experiences a transient rotor rub. Since generally no bristles 150 extend from the second portion 144 of the rim 140 because of the bristle angle, the deformed rim generally will not interfere with the bristles 150 even if the rim 140 deforms longitudinally toward the upstream-facing surface 128 of the backing plate 124, and thus the bristles can recover from a rotor rub.

Figure 4:
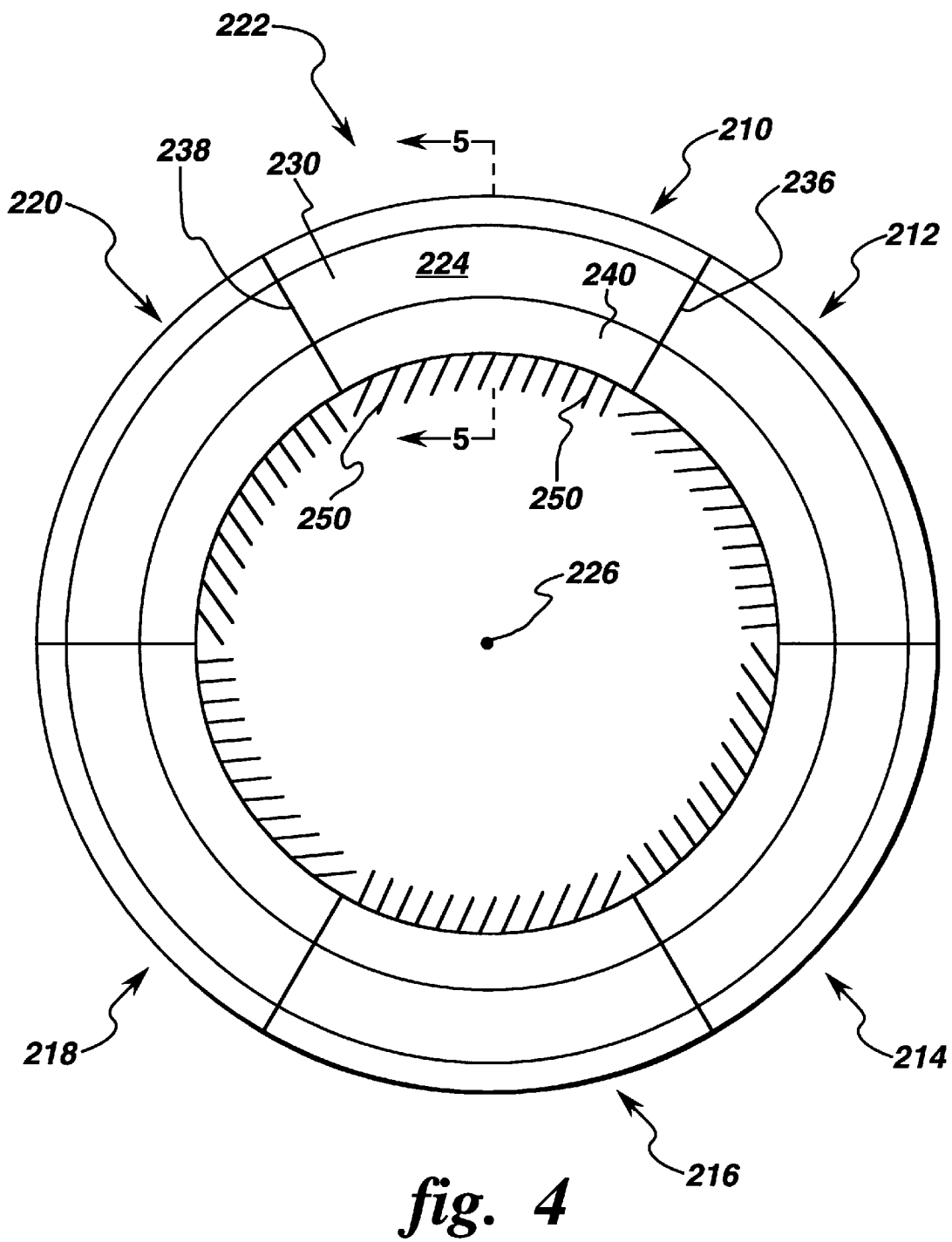
FIG. 4 is a schematic upstream-facing view of a second preferred embodiment of the brush seal segment of the invention shown circumferentially arrayed with other identical brush seal segments to define a brush seal.
Figure 5:
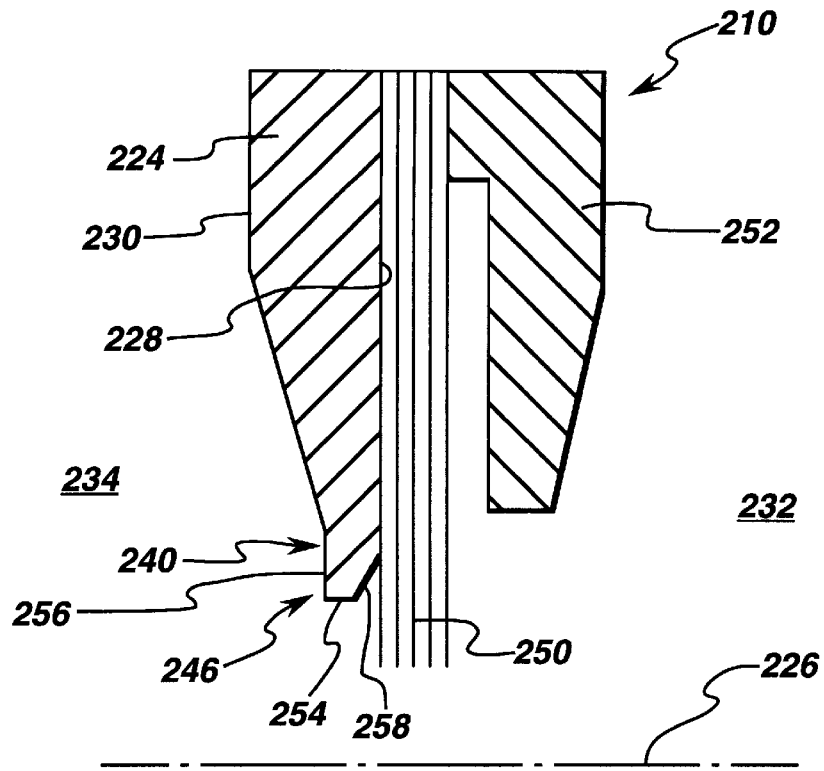
FIG. 5 is a cross-sectional view taken along lines 5—5 of FIG. 4.

Referring again to the drawings, FIGS. 4–5 schematically show a second preferred embodiment of the brush seal segment 210 of the present invention together with five other identical brush seal segments 212, 214, 216, 218, and 220 all circumferentially arrayed to define an annular brush seal 222. As before, preferably the annular brush seal 222 is for use in a rotary machine (not shown in the figures) with the brush seal being disposed in the annular gap between a rotor and a surrounding casing of the rotary machine and with the brush seal being attached to the casing. A preferred rotary machine is a steam turbine or a gas turbine.

The brush seal segment 210 includes a brush seal backing plate 224. As seen in FIG. 4, the backing plate 224 has a shape of generally an annular segment of a circular ring (e.g., the brush seal 212) having a longitudinal axis 226 (seen on end as a dot in FIG. 4 and seen as a dashed line in FIG. 5). The backing plate 224 has generally upstream-facing and downstream-facing surfaces 228 and 230 with the upstream-facing surface 228 aligned generally perpendicular to the axis 226. As before, for the purpose of describing the invention an upstream-facing surface is defined as a surface which faces generally toward the higher-pressure side 232, and away from the lower-pressure side 234, of the seal segment 210, and a downstream-facing surface is defined as a surface which faces generally toward the lower-pressure side 234, and away from the higher-pressure side 232, of the seal segment 210. The backing plate 224 has generally radially-aligned first and second edges 236 and 238 circumferentially bounding (i.e., attaching) together the upstream-facing and downstream-facing surfaces 228 and 230.

The backing plate 224 also has a rim 240 radially-inwardly bounding (i.e., attaching) together the upstream-facing and downstream-facing surfaces 228 and 230. The rim 240 circumferentially extends from the first edge 236 to the second edge 238. The rim 240 is deformable (i.e., shaped to deform), under a radial force (such as a transient rotor rub during turbine startup), longitudinally away from the upstream-facing surface 228.

Figure 6:
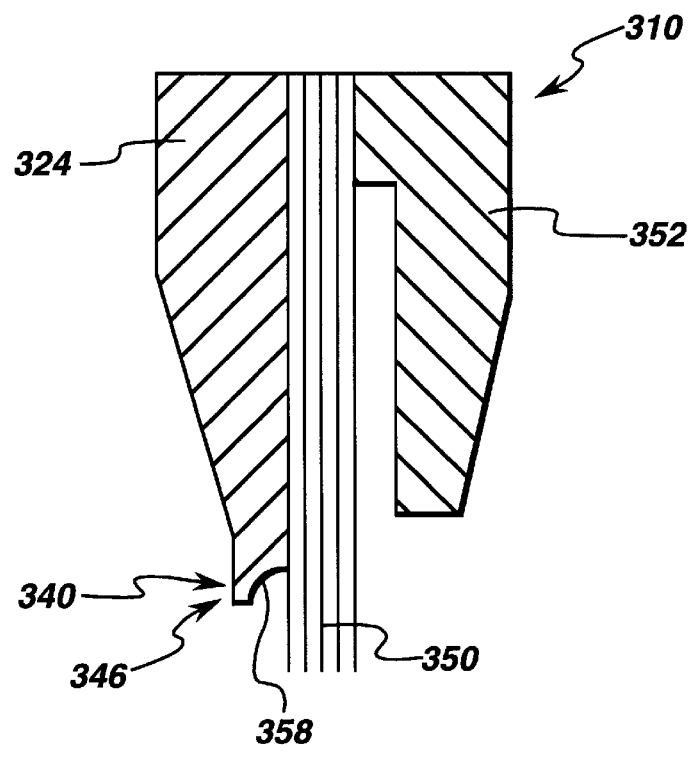
FIG. 6 is a view, as in FIG. 5, showing a different embodiment of the labyrinth-seal tooth of the brush seal segment.

Preferably, the rim 240 of the backing plate 224 has a shape of a labyrinth-seal tooth 246 when the backing plate 224 is viewed in a cross section (see FIG. 5) taken by a cutting plane defined by the intersection of the axis 226 and a radius line which extends radially outward (from the axis 226) to the rim 240. In a preferred construction, the tooth 246 circumferentially extends from generally the first edge 236 to generally the second edge 238, and the tooth 246 has a tip 254 which is aligned generally parallel to the axis 226. The tooth 246 also has a first surface,56 which extends generally radially outward from the tip 254 to the downstream-facing surface 230 of the backing plate 224 and further has a second surface 258 which extends generally radially outward and longitudinally upstream from the tip 254 to the upstream-facing surface 228 of the backing plate 224. The second surface 258 has a shape of a straight line when viewed in the above-defined cross section. FIG. 6 shows a different embodiment of the labyrinth-seal tooth 346 of the brush seal segment 310 of the present invention wherein the second surface 358 has a shape of a curved line when viewed in the above-described cross section.

It is noted that, in a conservative design, the second portion 144 of the rim 140 of the backing plate 124 of the previously-described first preferred embodiment of the brush seal segment 110 of the present invention has the shape of the rim 240 shown in FIG. 5 or the rim 340 shown in FIG. 6, as can be appreciated by the artisan. Here, the second portion 144 of the rim 140 is deformable (i.e., shaped to deform), under a radial force, longitudinally away from the upstream-facing surface 128. Design details of the rim 140 (including the tip 154, the first surface 156, and the second surface 158 of the tooth 146) are identical to those previously given in the descriptions of FIGS. 5 and 6.

The brush seal segment 210 also includes brush-seal bristles 250 generally abutting the upstream-facing surface 228 of the backing plate 224. The bristles 250 are each canted at a generally-identical angle with respect to a corresponding radius line extending outward (from the axis 226) to each of the bristles 250. Preferably, the angle of the bristles 250 is generally forty-five degrees. The bristles 250 are generally entirely circumferentially contained between a radius line extending outward (from the axis 226) to the first edge 236 and a radius line extending outward (from the axis 226) to the second edge 238. Thus, the brush seal segment 210, including its just-described bristles 250 and previously-described backing plate 224, is said to be radially cut. The bristles 250 extend inwardly beyond the rim 240.

The second preferred embodiment of the brush seal segment 210 of the present invention offers advantages, as can be appreciated by those skilled in the art. The rim is shaped to deform longitudinally away from the upstream-facing surface of the backing plate, so the deformed rim will not interfere with the bristles, and thus the bristles can, recover from a rotor rub.

In a typical construction, the backing plate 124, 224, and 324 including the rim 140, 240, and 340, is of monolithic construction and consists essentially of metal or metal alloy such as, but not limited to, stainless steel. The bristles 150, 250, and 350 typically consist essentially of metal-wire or ceramic-wire bristles such as, but not limited to, cobalt-based-alloy wire bristles. Preferably, metal-wire bristles 150, 250, and 350 are attached to the backing plate 124, 224, and 324 by welding (such weldment omitted from the figures for clarity). Commonly, the brush seal segment 110, 210, and 310 further includes an upstream plate 152, 252, and 352 as is known to the artisan.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A brush seal segment comprising:
 a) a brush-seal upstream plate;
 b) a brush-seal backing plate having a shape of generally an annular segment of a circular ring, said ring having a longitudinal axis, said backing plate having generally upstream-facing and downstream-facing surfaces, said upstream-facing surface aligned generally perpendicular to said axis, said backing plate having generally radially-aligned first and second edges circumferentially bounding together said upstream-facing and downstream-facing surfaces, said backing plate having a rim radially-inwardly bounding together said upstream-facing and downstream-facing surfaces, said rim having first and second portions, said first portion circumferentially extending from said first edge to said second portion, and said second portion disposed only proximate said second edge, wherein said second portion extends radially inward further than said first portion or said upstream plate; and
 c) brush-seal bristles disposed between said upstream and backing plates and generally abutting said upstream-facing surface, said bristles each canted at a generally-identical angle with respect to a corresponding radius line extending outward to each of said bristles, said bristles generally entirely circumferentially contained between a radius line extending outward to said first edge and a radius line extending outward to said second edge, and said bristles extending inwardly beyond said rim from generally said first portion only of said rim.

2. The brush seal segment of claim 1, wherein said second portion of said rim of said backing plate has a shape of a labyrinth-seal tooth when said backing plate is viewed in a first cross section taken by a cutting plane defined by the intersection of said axis and a radius line which extends radially outward to said second portion.

3. The brush seal segment of claim 2, wherein said first portion of said rim of said backing plate has a shape other than that of a labyrinth-seal tooth when said backing plate is viewed in a second cross section taken by a cutting plane defined by the intersection of said axis and a radius line which extends radially outward to said first portion.

4. The brush seal segment of claim 3, wherein said first portion of said rim of said backing plate has a shape of a line which is generally parallel to said axis when said backing plate is viewed in said second cross section.

5. The brush seal segment of claim 4, wherein said angle of said bristles is generally forty-five degrees.

6. A brush seal segment comprising:
 a) a brush-seal upstream plate;
 b) a brush-seal backing plate having a shape of generally an annular segment of a circular ring, said ring having a longitudinal axis, said backing plate having generally upstream-facing and downstream-facing surfaces, said upstream-facing surface aligned generally perpendicular to said axis, said backing plate having generally radially-aligned first and second edges circumferentially bounding together said upstream-facing and downstream-facing surfaces, said backing plate having a rim radially-inwardly bounding together said upstream-facing and downstream-facing surfaces, said rim having first and second portions, said first portion circumferentially extending from said first edge to said second portion, and said second portion disposed only proximate said second edge, wherein said second portion extends radially inward further than said first portion or said upstream plate; and
 c) brush-seal bristles disposed between said upstream and backing plates and generally abutting said upstream-facing surface, said bristles each canted at a generally-identical angle with respect to a corresponding radius line extending outward to each of said bristles, said bristles generally entirely circumferentially contained between a radius line extending outward to said first edge and a radius line extending outward to said second edge, and said bristles extending inwardly beyond said rim from generally said first portion only of said rim, wherein said second portion of said rim is deformable, under a radial force, longitudinally away from said upstream-facing surface, and wherein said second portion of said rim has a shape of a labyrinth-seal tooth when said backing plate is viewed in a cross section taken by a cutting plane defined by the intersection of said axis and a radius line which extends radially outward to said rim.

7. The brush seal segment of claim 6, wherein said tooth has a tip which is aligned generally parallel to said axis when viewed in said cross section, wherein said tooth has a first surface which extends generally radially outward from said tip to said downstream-facing surface of said backing plate, and wherein said tooth has a second surface which extends generally radially outward and longitudinally upstream from said tip to said upstream-facing surface of said backing plate.

8. The brush seal segment of claim 7, wherein said second surface has a shape of a straight line when viewed in said cross section.

9. The brush seal segment of claim 7, wherein said second surface has a shape of a curved line when viewed in said cross section.

* * * * *